Jan. 5, 1926.  1,568,786
R. WICKOP
MACHINE FOR CUTTING FRUIT INTO CUBES
Filed Jan. 22, 1925

Inventor:
Robert Wickop

Patented Jan. 5, 1926.

1,568,786

UNITED STATES PATENT OFFICE.

ROBERT WICKOP, OF LEUTHEN, GERMANY.

MACHINE FOR CUTTING FRUIT INTO CUBES.

Application filed January 22, 1925. Serial No. 3,909.

*To all whom it may concern:*

Be it known that I, ROBERT WICKOP, a citizen of the German Republic, residing at Leuthen, Germany, have invented certain new and useful Improvements in Machines for Cutting Fruit into Cubes (for which I have filed application for patent in Germany Jan. 19, 1924), of which the following is a specification.

This invention relates to a machine for cutting into cubes onions, carrots and other fruit. The invention consists in that the fruit is pressed by a knife cross of a toothed crown against the cutting disk, this toothed crown rotating with the fruit only at half the speed at which the cutting disk rotates and in opposite direction as this cutting disk, two rows of furrow knives being arranged on the cutting disk at a distance of 180° the one from the other and a cutting knife behind the furrow knives so that grooves are cut into the fruit by the second row of furrow knives at an angle of 90° to the grooves cut by the first row of furrow knives, the cutting knife cutting off small cubes.

By substituting for the cutting disk mentioned a cutting disk having only one row of furrow knives or a cutting disk on which a cutting knife follows on each row of furrow knives the machine may be used for cutting the fruit into strips.

Two embodiments of the invention are illustrated by way of example on the accompanying drawing, in which:—

Figure 1:
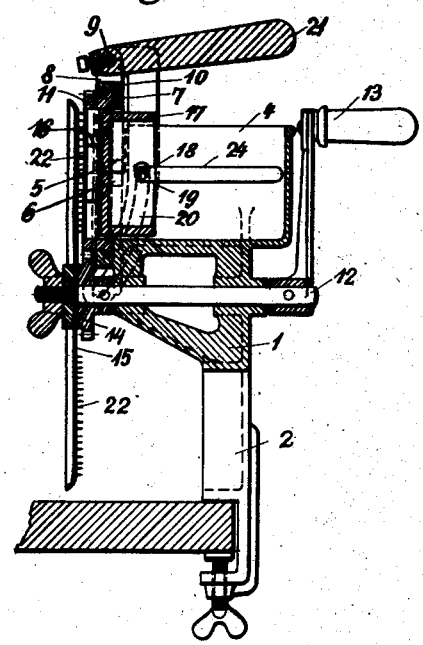
Fig. 1 is a vertical longitudinal section through the middle of the machine.

The cast iron frame 1 of the machine has two feet 2 and 3 to be fixed by screws on a table plate and a charging cylinder 4 to be filled with fruit to be cut. This charging cylinder 4 is open at the upper end and its outlet orifice is subdivided into two parts. A loose half-ring 7, the flanges 5 and 6 are fixed by means of screws on the cast iron frame, has bearing lugs 8 in which an axle 9 is journaled. Into the half-ring and the cast iron frame an annular groove 10 is arranged in which a toothed crown 11 is loosely and revolubly mounted so that the teeth project from the groove. Between the charging cylinder 4 and the feet 2 and 3 the driving shaft 12 is journaled in the cast iron frame, said shaft being rotated by means of a crank handle 13 and carrying a toothed wheel 14 which gears with the toothed crown 11 drawing this toothed crown along at the ratio of 2 x 1. On the front end of shaft 12 a cutting disk 15 is keyed which moves along the toothed crown 11. The toothed crown 11 forms a ring and carries a knife cross 16 composed of several knives which cross one another at right angles. A pressing plug 17 is mounted in the charging cylinder and guided by two lateral bolts 18 in longitudinal grooves 24 of the charging cylinder 4. The guide bolts 18 are preferably of angular cross section in order to prevent jamming of the presser plug in the cylinder. Over the outer round end of each guide bolt 18 a bow-shaped lever 19 grips by means of its arc-shaped guide slot 20 said two levers 19 being fixed on the axle 9 adapted to be rotated by means of a hand lever 21 keyed on said axle so that the levers 19 oscillate and move thus the presser plug 17 to and fro.

On the cutting disk 15 two rows of furrow knives 22 are arranged displaced 180° the one to the other. The knives stand perpendicular to the plane of the disk and are of little height. The height of these furrow knives determines the height of the cubes to be cut off or the depth of the grooves to be cut into the fruit. The knives extend closely to the side surface of the toothed crown 11 through which the fruit passes and the knives cut thus grooves into the fruit. As the second row of furrow knives is displaced 180° with regard to the first row of furrow knives and as the toothed crown 11 executes half a revolution for each rotation of the driving shaft 12 the second row of furrow knives cuts grooves into the fruit at 90° to the grooves cut by the first row of furrow knives. The cutting disk 15 carries further a cutting knife 23 which projects at an acute angle from the surface of the disk so that its cutting edge reaches closely to the outer surface of the toothed crown 11. This cutting knife follows behind the second row of furrow knives 22 and cuts off the layer of the fruit which has grooves crosswise so that small cubes drop off. When the machine is used the lever 21 is first raised whereby the pressing plug is moved to the rear end of the charging cylinder 4. Into the front part of the cylinder 4 the fruit is filled whereupon the hand lever 21 is depressed and the crank handle 13 rotated. The machine is designed especially for cutting onions into cubes. The onion is a comparatively hard and sleek fruit. It is pressed by the pressing plug 17 into the split ring and rotated together with the same, as the split ring has a toothed crown 11 meshing with the toothed wheel 14. The rotation of this split ring with the onion pressed into the knives 16 cannot be impeded by the pressing member as the onion is hard and sleek and slides or slips upon the split ring. The fruit can therefore rotate with the split ring. The fruit can further be advanced after every cutting and at the cutting and rotating of the fruit the pressure can be interrupted.

The pressure on the pressing member must be so strong that the onion is pushed through the knives of ring 11 up to the surface of the cutting disk 15 which is rotated and has two rows of knives 22 arranged in radial directions and spaced 180° the one from the other. These knives stand perpendicular on the surface of the cutting disk and cut into the onion projecting from the ring 11. As the second row of knives is displaced 180° with regard to the first row of knives and as the split ring 11 with the fruit rotates only at half the speed of the cutting disk the onion has been rotated 90° with regard to the position in which the knives of the first row have cut into it when the knives of the second row begin to cut. The cuts made by the knives of the second row are perpendicular to those made by the knives of the first row. On the second row of knives 22 follows on the knife disk the knife 23 the cutting edge of which extends close to the split ring and cuts off the portion of the onion which projects from the split ring and has been cut crosswise by the knives 22. The cut off portion of the onion is a disk which has been cut crosswise and separated into cubes.

Figure 4:
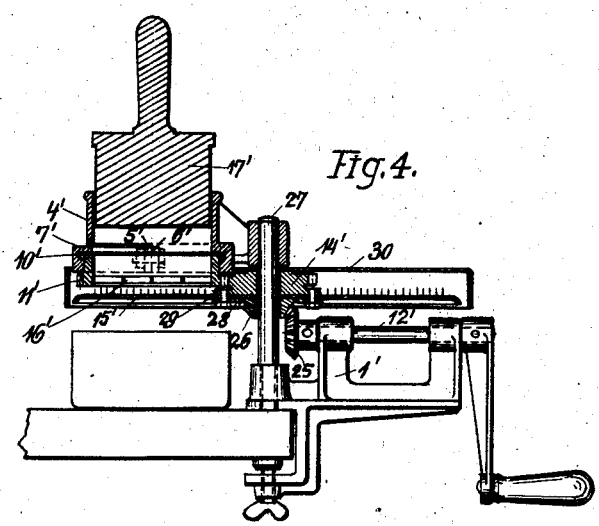
Fig. 4 is a vertical longitudinal section and partly a side elevation of another form of construction of the machine.
Figure 3:
Fig. 3 is a vertical section through the centre of the cutting disk.

In the form of construction of the machine shown in Fig. 4 the cutting disk is horizontally arranged. This form of construction of the machine is simpler as the charging cylinder is vertical so that the fruit can be advanced by the action of a simple pressing plug. The driving shaft 12' journaled in the cast iron frame 1' carries a bevel wheel 25. This bevel wheel meshes with the bevel wheel 26 loosely mounted on a shaft 27 vertically mounted in the cast iron frame. The bevel wheel 26 has a flange 28. A toothed wheel 14' loosely mounted on shaft 27 has a flange 29. The two flanges 28 and 29 are rigidly connected the one with the other by means of screws and the cutting disk 15' is clamped between the two flanges and connected with the same by screws. The bevel wheel 26, the cutting disk 15' and the toothed wheel 14' are thus rigidly connected with one another. The toothed wheel 14' meshes with the toothed crown 11' which is loosely and rotatably mounted in an annular groove 10' of the charging cylinder 4', the lower part of this charging cylinder being composed of two parts, one half of the annular groove being arranged in the half ring 7' fixed by means of flanges 5' and 6'. A hand-operated plug 17' serves to press the fruit filled into the cylinder 4' onto the knife cross 16' of the toothed crown 11'. A protecting cover 30 covers the cutting disk 15'. This protecting cover is mounted on the vertical shaft 27 and clamped between the toothed wheel 14' and the bearing of shaft 27.

Figure 2:
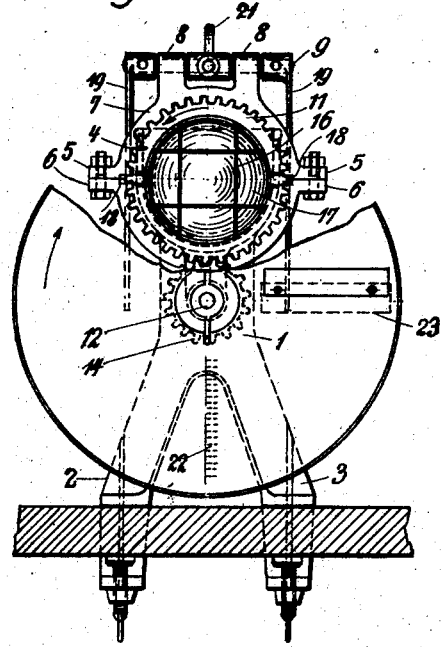
Fig. 2 is a front elevation.

The operation of this machine of modified construction is almost similar to that described with reference to the machine shown in Figs. 1 and 2.

In order to cut into the fruit straight crossing grooves instead of arc-shaped grooves it is necessary to rotate the toothed crown 11 or 11' with the fruit in the same direction as the cutting disk. With this object in view an intermediate wheel is inserted between the toothed wheel 14 or 14' and the toothed crown 11 or 11' or between the toothed wheels 25 and 26.

When the fruit has to be cut into strips instead of cubes a cutting disk having only one row of furrow knives or a cutting disk having one cutting knife for each row of furrow knives has to be used.

I claim:—

1. A machine for cutting fruit in cubes, comprising in combination a cast iron frame, feet of said frame designed to be fixed by screws on a table, a charging cylinder having an annular groove, a toothed crown loosely mounted in said annular groove so that its teeth project from the groove, a knife cross in said toothed crown, a driving shaft mounted in said cast iron frame and driving said knife cross frame, a cutting disk on the driving shaft, two rows of furrow knives on said cutting disk standing perpendicular to the surface of the disk and displaced of 180° the one to the other, these knives being of such a height that they move closely along the plane of said toothed crown, a cutting knife radially mounted in said cutting disk at an angle to the plane of said cutting disk, and a pressing plug in said charging cylinder designed to press the fruit against said cutting disk.

2. A machine for the cutting of fruit into cubes, comprising in combination a cast iron frame, two feet of said frame adapted to be fixed by means of screws on a table, a charging cylinder having an annular groove, a toothed crown loosely and revolubly mounted in said annular groove so that its teeth project from said groove, a knife cross in said toothed crown, a driving shaft mounted in said cast iron frame at the side of said charging cylinder, a toothed wheel on said shaft meshing with the toothed crown and rotating the same at the ratio 2 x 1, a cutting disk on said driving shaft rotating along said toothed crown, two rows of furrow knives vertically mounted on said cutting disk and displaced 180° the one to the other, said knives being of such a height that they move closely along the outer surface of said toothed crown, a cutting knife radially inserted into said cutting disk and projecting at an angle from the plane of said cutting disk so that its cutting edge moves closely along the plane of said toothed crown, a pressing plug in said charging cylinder, designed to press the fruit against said cutting disk, substantially as described and for the purpose set forth.

In testimony whereof I affix my signature.

ROBERT WICKOP.